US012216062B2

(12) United States Patent
Piana et al.

(10) Patent No.: US 12,216,062 B2
(45) Date of Patent: Feb. 4, 2025

(54) APPARATUS AND METHOD FOR INSPECTING CANS

(71) Applicant: KRONES AG, Neutraubling (DE)

(72) Inventors: Stefan Piana, Koefering (DE); Rainer Kwirandt, Barbing (DE)

(73) Assignee: KRONES AG, Neutraubling (DE)

( * ) Notice: Subject to any disclaimer, the term of this patent is extended or adjusted under 35 U.S.C. 154(b) by 241 days.

(21) Appl. No.: 17/712,636

(22) Filed: Apr. 4, 2022

(65) Prior Publication Data

US 2022/0334066 A1 Oct. 20, 2022

(30) Foreign Application Priority Data

Apr. 14, 2021 (DE) ...................... 10 2021 109 287.6

(51) Int. Cl.
| | | |
|---|---|---|
| *G01N 21/90* | (2006.01) | |
| *G01N 21/21* | (2006.01) | |
| *G01N 21/84* | (2006.01) | |
| *G01N 21/88* | (2006.01) | |

(52) U.S. Cl.
CPC ......... *G01N 21/9072* (2013.01); *G01N 21/21* (2013.01); *G01N 21/8806* (2013.01); *G01N 21/8851* (2013.01); *G01N 21/909* (2013.01); *G01N 2021/845* (2013.01); *G01N 2021/8848* (2013.01); *G01N 2201/0683* (2013.01)

(58) Field of Classification Search
CPC .............. G01N 21/9072; G01N 21/21; G01N 21/8806; G01N 21/8851; G01N 21/909; G01N 2021/845; G01N 2021/8848; G01N 2201/0683; G01N 21/9018; G01V 8/10
See application file for complete search history.

(56) References Cited

U.S. PATENT DOCUMENTS

| | | | | |
|---|---|---|---|---|
| 4,924,107 A | * | 5/1990 | Tucker | ................. G01N 21/909 |
| | | | | 356/240.1 |
| 5,134,278 A | | 7/1992 | Nelen | |
| 5,220,400 A | | 6/1993 | Anderson et al. | |
| 5,805,279 A | * | 9/1998 | Palombo | ............ G01N 21/8806 |
| | | | | 356/239.4 |

(Continued)

FOREIGN PATENT DOCUMENTS

| | | |
|---|---|---|
| DE | 199 40 363 A1 | 3/2001 |
| DE | 10 2007 018 870 A1 | 10/2008 |

(Continued)

*Primary Examiner* — Tarifur R Chowdhury
*Assistant Examiner* — Roberto Fabian, Jr.
(74) *Attorney, Agent, or Firm* — Schmeiser, Olsen & Watts LLP

(57) ABSTRACT

An apparatus for inspecting containers and in particular cans, having an illumination device which illuminates the can to be inspected and radiates radiation onto an inner base wall of the container, and having an image recording device which records at least one spatially resolved image of the inner base wall illuminated by the illumination device is provided. The apparatus has a first polarization device in a beam path between a light source of the illumination device and the inner base wall in such a way that the radiation reaching the inner base wall is polarized, wherein the illumination device being designed in such a way that a predominant proportion of the radiation irradiated into the container by the illumination device reaches the inner base wall.

11 Claims, 2 Drawing Sheets

(56) References Cited

U.S. PATENT DOCUMENTS 5,822,056 A * 10/1998 Waters .................. G01B 11/24
                                                    356/240.1
6,654,116 B1 * 11/2003 Kwirandt ............. G01N 21/909
                                                    356/240.1

FOREIGN PATENT DOCUMENTS

| DE | 10 2008 029 661 A1 | 12/2009 | | |
|----|----|----|----|----|
| DE | 11 2016 002 237 T5 | 2/2018 | | |
| DE | 102017223347 A1 * | 6/2019 | ........... | B07C 5/3408 |
| DE | 10 2018 126 865 A1 | 4/2020 | | |
| EP | 0362679 A2 | 4/1990 | | |
| JP | 2000346813 A * | 12/2000 | | |
| WO | 2014/206508 A1 | 12/2014 | | |
| WO | 2019/072989 A1 | 4/2019 | | |

* cited by examiner

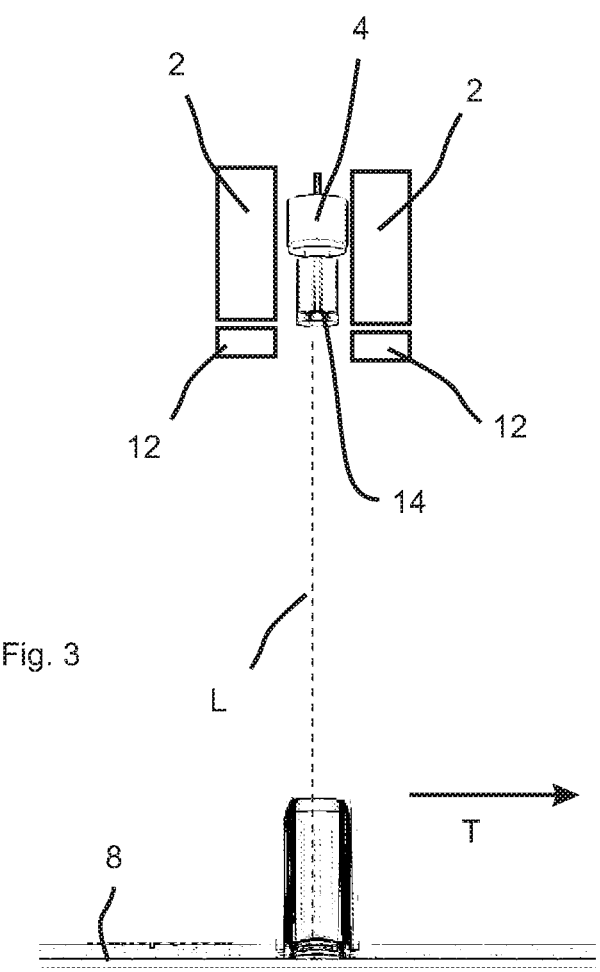

APPARATUS AND METHOD FOR INSPECTING CANS

CROSS-REFERENCE TO RELATED APPLICATION

This application claims priority to German Application No. 10 2021 109 287.6, having a filing date of Apr. 14, 2021, the entire contents of which are hereby incorporated by reference.

FIELD OF TECHNOLOGY

The following relates to an apparatus and a method for inspecting containers in the food industry and in particular cans or beverage cans. Various apparatus and methods for inspecting containers are known from the conventional art. In particular, the inspection of cans is usually relatively difficult in the conventional art, since on the one hand they are not transparent and on the other hand they also have highly reflective (inner) and structured surfaces.

BACKGROUND

In the state of the art, the inspection of a can interior is usually carried out with a wide-angle interior wall lens and an illumination that illuminates the can as uniformly as possible. For this purpose, large-area lamps are used in the state of the art, which shine into the can mouth with as many light directions as possible. In this way, foreign bodies are usually found which create a darkening in the image.

Since cans are often packed with transparent films when they are delivered, shreds of film also get into the cans as foreign objects. Such foils are very problematic to detect because they are clear or transparent.

It is known from the applicant's internal conventional art to use polarized light in the inspection technique, with which polarized foils can be detected. However, not all foils are strongly polarizing. Some do not polarize at all or only slightly. For the less polarizing foils, a dark field method would in itself be advantageous, but this does not usually work in cans, as it is based on transillumination of an object.

It would be desirable to provide a method that allows the detection of both polarizing and non-polarizing films within cans.

The problem with such inspection procedures arises from the cans. These are often made of a shiny metal and form a reflective inner body. When light is irradiated, it is reflected several times on the inner wall, which creates a very diffuse illumination and is therefore desirable for normal foreign object detection. In the process, it constantly changes its direction and also the direction of polarization. Thus, even if polarized light is irradiated, its polarization is quickly destroyed. The applicant has determined that the side walls in particular, for example round side walls, contribute very strongly to depolarization.

In the state of the art, the entire can is usually illuminated and thus the light is always strongly depolarized. This makes it practically impossible to inspect even highly polarized films, and even more difficult to detect weakly polarized films.

One possible approach would be to use new types of polarization cameras that simultaneously record images with 0°, 45°, 90° and 135° linear polarization. However, the applicant's investigations showed that even such a camera cannot recognise foils without polarized illumination. Even with polarized light, these cameras can observe practically nothing if the can wall is also to be inspected and weakly polarizing foils are also to be detected. Experiments were carried out which showed that at best a strongly polarizing film could be detected. In a further experimental procedure, images were taken with crossed polarizing filters. Here, too, practically no dark field procedure could be carried out and here, too, the corresponding foils could hardly be seen. For the experiments carried out, both strongly polarizing and weakly polarizing as well as non-polarizing foil pieces were used inside the cans.

In each case, only the strongly polarizing foils could be detected.

EP 0362679 describes an apparatus and a method for inspecting the inner surface of cans. A circular polarizer is used for this purpose.

WO 2019/072989 A1 describes an apparatus for inspecting cans. Here, an illumination device is arranged between an observation device and a lens.

SUMMARY

An aspect relates to an inspection device or an inspection method, in particular for inspecting containers such as cans, which can also detect different objects, in particular different transparent objects with different polarization.

An apparatus according to embodiments of the invention for inspecting containers and in particular cans has a transport device which transports the containers along a predetermined transport path and an illumination device which illuminates the containers to be inspected. In doing so, the illumination device emits radiation and, in particular, light through an opening of the container onto an inner bas wall of the container. Furthermore, the device has an image recording device which records at least one spatially resolved image of the radiation irradiated by the illumination device onto the inner base wall and reflected or backscattered by the inner base wall and/or which records a spatially resolved image of the inner base wall illuminated by the illumination device.

According to embodiments of the invention, the apparatus has a beam path between a light source of the illumination device and the inner wall, a first polarizer device, such that the radiation reaching the inner wall is polarized, wherein the illumination device is further designed such that a predominant proportion of the radiation irradiated into the container by the illumination device strikes the inner base wall.

In time-consuming and extensive investigations, the inventor was able to determine that a contrast of transparent plastic parts in cans is improved if the illumination device is positioned further away from the container and thus achieves a higher directivity. For this reason, experiments were conducted in which a corresponding illumination of the container or a can was positioned relatively far from the container. It was found that the detection of foils improves but is not yet satisfactory. Further experiments showed that some of the foils used were only slightly polarizing or not polarizing at all.

With this, the inventors went a different way to also detect such foils. First, a defined polarized light was used.

Furthermore, the arrangement was modified in such a way that a highly directional polarized light was irradiated into the container or the cans in such a way that essentially only the inner base wall or the can dome is illuminated and practically not the wall of the can. In some cases, the inner base wall has a roughly horizontal course. In this way, a lot of radiation or light is reflected back out of the can mouth with only one reflection. Linearly polarized light retains its polarization direction. Circularly polarized light only changes its direction of rotation through this process. In this way, as described in more detail below, it is also possible to perform sensitive dark-field procedures.

In an embodiment, the apparatus according to embodiments of the invention is thus suitable and intended for carrying out dark field inspection method. In an embodiment, the apparatus is therefore designed in such a way that an image is taken essentially of the irradiated or illuminated inner wall. In particular, in the case of the radiation emitted onto the interior of the containers or cans, a small part reaches the walls of the corresponding cans. As mentioned above, the containers are cans and/or containers with a non-transparent wall and/or a light-reflecting wall.

In an embodiment, at least 60% of the total intensity of the irradiated radiation and in particular of the radiation reaching the interior of the container, is at least 70%, at least 80% or at least 90% (of the radiation reaching the interior of the container) reaches the inner wall of the base of the container. In an embodiment at most 40%, at most 30%, at most 20% or at most 10% of the emitted or irradiated radiation reaches a side wall of the container.

In an embodiment, only a small part of the radiation reflected back from the container as a whole reaches a side wall of the container along its radiation path. This is also based on the fact that the radiated radiation may still reach the inner wall of the container, but not the radiation further reflected from it to the image recording device. In an embodiment, at most 20%, at most 15% or at most 10% of the radiation radiated into the container also ultimately reaches the observation device via a reflection on an inner wall.

In an embodiment, the container is a container that is open at the top. For example, the container can be a can, the opening of which is still open because a lid is only inserted afterwards. In an embodiment, a cross-section of an opening through which the container is illuminated is slightly smaller than a base body of the container. For example, a cross-section of the opening may be between 80% and 99% of the cross-section of the container. In an embodiment, the container is made of a metallic material, for example tinplate or aluminium sheet.

In an embodiment, the device comprises a trigger and/or control device that triggers an image capture and the illumination together.

In an embodiment, the transport device is a conveyor belt on which the containers are conveyed upright. In an embodiment, the transport device conveys the containers in a straight line (or in a straight-line direction). In an embodiment, the containers are transported in a single lane.

In an embodiment, the apparatus is designed in such a way that the radiation is reflected only once, in particular at the inner base wall, and then hits the image recording device.

In a further embodiment, the first polarization device is suitable and intended for generating linearly polarized or circularly polarized radiation or linearly or circularly polarized light.

In a further embodiment, the apparatus has an image evaluation unit that evaluates the images captured by the image recording device. It is possible that the apparatus has a comparison device that compares the captured images with reference images. Furthermore, it is possible that the apparatus uses artificial intelligence (AI) to evaluate the images.

In an embodiment, at least one of the recorded images is evaluated in order to conclude on foreign bodies inside the container. A corresponding evaluation can be carried out by means of algorithms or also with the use of artificial intelligence.

More precisely, a recognition of differently polarizing foils, for example, can be carried out by means of a conventional algorithm or by using a neural network for image processing. In an embodiment, a convolutional neural network (CNN) can be used. After training with suitable and high-quality annotated camera images, this can enable higher selectivity.

Furthermore, it is possible that a plurality of reference images are stored, in particular in a memory device, and a comparison device is provided which compares these stored images with recorded images. On the basis of this comparison, the presence of differently polarizing foils or other foreign bodies can be concluded.

In an embodiment, the image recording device records at least one spatially resolved image of the container bottom and/or the container. In an embodiment, the image recording device generates spatially resolved (in particular 2D and/or 3D) sensor data (of the container bottom) for the detection of the container.

In an embodiment, evaluation data are generated from the sensor data, in particular using a processor device and/or data processing device, by applying at least one (computer-implemented) computer vision method in which (computer-implemented) perception and/or detection tasks are performed, for example (computer-implemented) 2D and/or 3D object recognition methods and/or (computer-implemented) methods for (computer-implemented) semantic segmentation and/or (computer-implemented) object classification and/or (computer-implemented) object localisation.

During object classification, the object detected and/or displayed in the sensor data is assigned to a (previously taught and/or predefined) class. In the case of object localisation, in particular in addition to object classification, a location of an object (e.g., a foil) detected and/or displayed in the sensor data (in particular in relation to the sensor data) is determined or identified, which is marked and/or highlighted in particular by a so-called bounding box. During semantic segmentation, each pixel of the sensor data in particular is assigned a class (for classifying an object) (in particular from a predetermined plurality of classes) (class annotation).

The classes can be, for example (among others), types of contamination (such as films with different polarization properties).

In an embodiment, the determination of the evaluation data from the (raw) data generated by the sensor device or data derived therefrom (in particular the execution of computer vision methods or perception methods) is based on (computer-implemented) machine learning methods, on at least one (artificial) neural network-based machine learning method. Such a neural network can, for example, be designed as a deep neural network (DNN) and/or a so-called convolutional neural network (CNN) and/or a recurrent neural network (RNN).

The evaluation device for evaluation can be integrated into the inspection device or into a higher-level machine control system. In an embodiment, the particularly intelligent evaluation device is able to assess the presence of a foreign object using modern algorithms (AI, i.e., artificial intelligence, machine learning, deep learning, etc.). In an embodiment, the evaluation device comprises a processor and/or a memory device. In an embodiment, the evaluation device is suitable and intended to make a predictive prediction with regard to the presence of foils or other foreign bodies.

When circularly polarized light is irradiated, a light source such as a lamp can shine through the same circular filter through which the imaging recording device or camera looks. Since the light changes its direction of rotation from, for example, left-circular to right-circular when it reflects off the inner base wall, the reflected radiation or light is blocked by the left-circular filter. In this case, the image remains dark overall unless, for example, polarization-changing foils create a disturbance.

With corresponding recordings, it could be proven that in particular strongly polarizing foils and also weakly polarizing foils can be seen well on the respective image and can thus also be evaluated well. With a non-polarizing foil, on the other hand, only artefacts are visible. The foils to be detected may also be non-polarizing foils that have been torn or pulled and thus become polarizing in the corresponding areas. These polarizing spots may also be visible.

Circular light or circular radiation has the advantage that foreign objects and in particular foils can be imaged and detected in the same way in all rotational positions. Only an inspection station is required for this.

In an embodiment, the inspection device described herein serves to detect foreign bodies within the container and, in particular, to detect transparent foreign bodies within the container.

The disadvantage of circular polarized light, however, is that often the inner base wall is somewhat rough and not optically flat like a real mirror. This means that circular polarizing filters do not darken completely or perfectly.

Images were taken in which, for example, a brighter stripe appears perpendicular to a brushing direction of the inner base. However, such stripes could be masked out as part of the image evaluation, for which an artificial intelligence (AI) would be suitable, again as described in more detail below.

When using linearly polarized light and a camera polarizing filter in a given direction and especially in a 90° blocking direction, the inner wall of the container is better darkened. Even a bright stripe perpendicular to a can bottom brush is hardly visible. This improves and facilitates a foil detection.

A disadvantage of using linearly polarized light is, however, that in the case where the foils have a polarization axis that is parallel or perpendicular to the directions of the polarizing filters, the foils do not light up brightly. Therefore, in the case of linearly polarized light, two inspection stations rotated by 45° are used so that all foil elements can be reliably detected. In an embodiment, the apparatus described here has two stations of the type described above. These two stations can be arranged one behind the other in the transport direction of the containers.

Thus, it is possible that a first image is taken in which two weakly polarizing foils are only faintly visible due to an unfavourable rotation position, while they are each clearly visible after a 45° rotation.

In a further embodiment, the radiation irradiated by the illumination device onto the inner base wall includes, in a direction perpendicular to the inner base wall (which is in particular also a longitudinal direction in which the wall of the container extends) and/or a longitudinal direction of the container, an angle which is less than 30°, less than 25°, less than 20°, less than 15° or less than 10°. In this way, the radiation or the light is irradiated at a very flat angle (i.e., in particular a very small angle relative to a longitudinal axis of the container) with respect to the longitudinal direction of the container. In this way, it can be ensured that only very little radiation reaches the side surfaces of the container.

In an embodiment, the illumination device and/or the image recording device have a distance from a mouth of the can which is greater than 100 mm, greater than 200 mm, greater than 300 mm, greater than 400 mm or greater than 500 mm. By this procedure, a very flat (i.e., a very small angle with respect to the longitudinal direction) irradiation in the direction of observation can also be achieved. In addition, the height of the container is added to determine the distance to the inner wall. This can be more than 100 mm, or more than 150 mm.

In an embodiment, therefore, a distance between the illumination device and/or the image recording device and the mouth of the container is less than 1400 mm, less than 1200 mm, less than 1000 mm, less than 900 mm or less than 800 mm.

In an embodiment, the image recording device captures the at least one image at an angle with respect to a direction perpendicular to the inner base wall and/or a longitudinal direction of the container which is less than 30°, less than 25°, less than 20°, less than 15° or less than 10°.

Thus, both the irradiation and the observation of the image take place at a very small angle with respect to a longitudinal direction of the container. In an embodiment, a further polarization device is also arranged between the inner base wall and the image recording device. Thus, the image recording device records the image through this polarization device, or the beam path of the light reflected from the inner base wall also runs through a (possibly further) polarization device.

In an embodiment, the illumination device is an LED spot illumination, which is arranged directly next to and/or close to the image recording device and/or the camera lens. In an embodiment, a polarization filter is arranged both in front of the illumination device and in front of the image recording device or the lens of the image recording device.

At the above distances, good results were achieved when both the illumination device and the lens and/or image recording device were at a distance between 500 mm and 700 mm above the can mouth.

Due to the geometries described here, both the image recording device and the illumination device only look at the (in particular centrally positioned and/or transported) can at a small angle. This small angle is advantageous so that the light spot only illuminates the inner base wall as far as possible. A stronger illumination of the wall of the container or the can would illuminate the inside of the container with depolarized light and impair the inspection.

A small viewing angle is also advantageous for the image recording device so that it can image or observe the entire bottom of the container. This can be achieved, for example, by means of a telephoto lens.

In an embodiment, the illumination device is thus a point light source or a spotlight source. In particular, an LED light source and in particular an LED spotlight source is used as the illumination device. Thus, a spot effect can be achieved, for example, by means of a converging lens which is arranged approximately at the distance of its focal length in front of the light source (such as an LED). In this way, the focal point beam also becomes a parallel beam. Seen from the outside, a spotlight source thus appears as a parallel radiating surface, even if a point light source is used as the actual light source. In an embodiment, a light source is used that emits essentially parallel light.

In an embodiment, a beam path of an illumination device includes an angle with the beam path for image capturing that is less than 30°, less than 25°, less than 20°, less than 15° or less than 10°.

In an embodiment, a light source is an LED white light source.

In a further embodiment, the apparatus has a second or further illumination device which illuminates the inner base wall (wherein these two illumination devices being triggered one after the other, for example with a double trigger), wherein the radiations irradiated onto the inner base wall by the two illumination devices having different polarization properties. In particular, the two beams have different polarization directions.

However, it would also be possible for the containers to be illuminated simultaneously by means of several illumination devices, wherein in this case the radiations emitted by the two illumination devices have the same polarization direction.

In a further embodiment, the image recording device has a polarization camera. A polarization camera is a camera that makes physical material properties visible that cannot be detected with classic vision technology. The basis is an image sensor that provides data on the polarization state of the light. In this case, no further polarizer is required in the beam path in front of the camera.

The detection of foils can be carried out as described with two illumination devices, with offset polarization direction and in particular with 45° offset linear polarization direction as well as a polarization camera (which in particular works in double trigger mode, i.e., takes two pictures at (almost) the same place).

In an embodiment, the first lamp is controlled in a first recording and the lamp with the linear polarizing filter rotated relative to the first lamp, in particular rotated by 45°, is controlled in a second recording.

The double image recording can take place within a time of at most 5 ms, less than 2 ms, less than 1 ms or less than 0.5 ms. The rotation of the first to the second linear polarization filter can be from 35-55° or from 40-50°. The image recording sensor may be, for example, a Sony Pregius 5.0 IMX250MZR CMOS sensor.

Embodiments of the invention are further directed to a method for inspecting containers and in particular cans, wherein a transport device transports the containers along a predetermined transport path and an illumination device illuminates the containers to be inspected and radiates radiation through an opening of the container onto an inner base wall container, and an image recording device records at least one spatially resolved image of the inner base wall (and/or of the radiation reflected from the inner base wall).

According to embodiments of the invention, a first polarization device provided in a beam path between a light source of the illumination device and the inner base wall polarizes the radiation reaching the inner base wall, wherein a predominant proportion of the radiation irradiated into the container by the illumination device reaches the inner base wall.

In a method, the radiation (or a large part of this radiation) radiated into the container by the illumination device is only reflected at the inner base wall before it reaches the image recording device. Only a reflection of the radiation to be observed takes place. By a major part of the radiation is understood at least 60%, at least 70%, at least 80% or at least 90% of the radiation irradiated into the container. It is also possible that a part of the radiation radiated into the container is also reflected by a side wall, but in particular in such a way that the radiation reflected (at least also by the side wall) no longer reaches the observation device.

In an embodiment, at least one foreign body located in the container is captured and/or detected with the aid of this image recording. In an embodiment, a foreign body lying on the inner base wall is detected. In an embodiment, the foreign body is an at least partially transparent foreign body. In a method, the foreign body is a foil-like foreign body.

In a further method, the illumination device captures radiation radiated onto the inner base wall and reflected from the inner base wall.

In an embodiment, an image is captured during a movement of the container in the transport direction.

In an embodiment, the polarization device generates linearly or circularly polarized light, which then reaches the inner base wall. In a method, a large part of the radiation irradiated onto the container by the illumination device reaches the inner base wall. In an embodiment, a large part of the radiation incident on the inner wall is also reflected only once within the container.

As mentioned above, a low angle of irradiation is with respect to a direction perpendicular to the inner surface of the base and in particular a longitudinal direction of the container.

In an embodiment, the majority of the irradiated radiation is at least 60%, at least 65%, at least 70%, at least 75%, at least 80%, at least 85% or at least 90% of the irradiated radiation.

In a further embodiment, the presence of foil elements within the container is inferred based on the image captured by the image recording device.

In an embodiment, the image recorded by the image recording device is therefore evaluated by means of an evaluation device.

In a further method, radiation reflected from the inner wall passes through or passes through polarization devices before reaching the image recording means.

In an embodiment, the observation method is a dark field method. It is possible that this dark field method results from the fact that radiation is polarized twice or passes through different polarization filters twice.

BRIEF DESCRIPTION

Some of the embodiments will be described in detail, with references to the following Figures, wherein like designations denote like members, wherein:

FIG. 3 shows a third embodiment of the apparatus according to embodiments of the invention.

DETAILED DESCRIPTION

Figure 1:
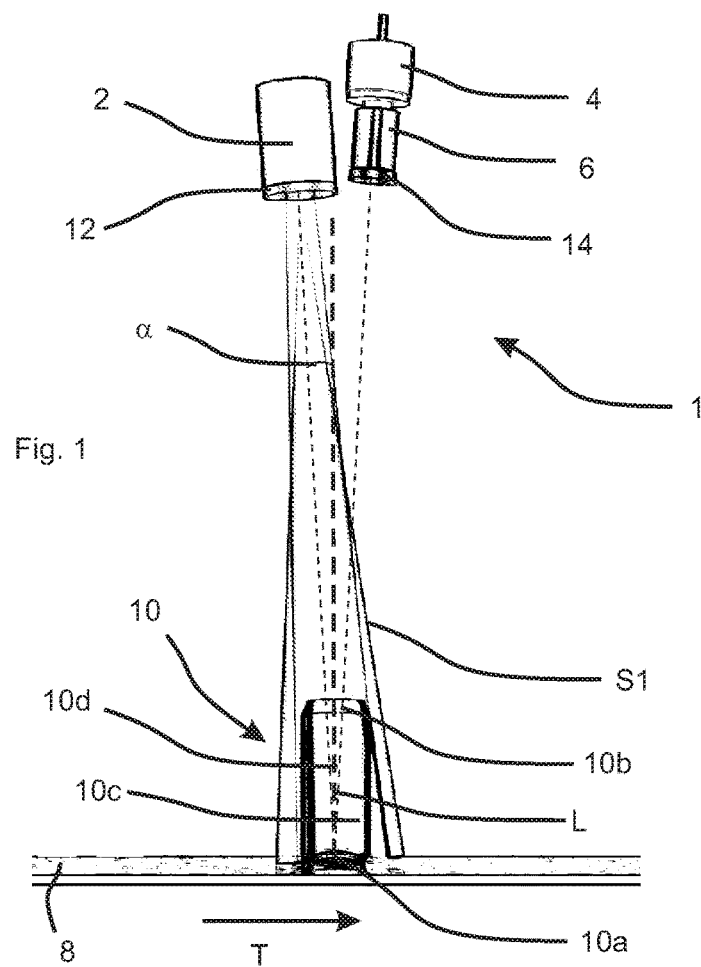
FIG. 1 shows a first embodiment of the apparatus according to embodiments of the invention.

FIG. 1 shows a schematic representation of an apparatus 1 according to embodiments of the invention for inspecting containers 10. The containers 10 in this case are cans which are still open and have an inner base wall 10a, an inner side wall 10c, an interior 10d and an opening 10b. The reference sign 51 indicates the radiation emitted by the illumination device 2.

The reference sign 2 indicates an illumination device such as an LED spot which emits light through a first polarization device 12 onto the container 10. Due to the small angle α with respect to a longitudinal direction L of the container, it is achieved that a large part of the radiation is irradiated onto the inner base wall 10a and only a small part reaches the container inner wall 10c.

Reference sign 8 indicates a transport device which transports the containers along a transport path T, here in a straight direction. The containers are recorded or inspected during this movement. This transport device 8 can be a conveyor belt, for example. Sensor devices such as light barriers can be provided in a region of the transport devices, which detect a position of the containers 10 and/or enable triggering of the illumination device and/or the image recording device.

The light reflected from the inner base wall 10a is also reflected towards an image recording device 4. The reference sign 6 indicates a lens and the reference sign 14 indicates a further polarization device which serves to polarize the light. Thus, the light emitted by the illumination device passes here through two polarization devices before it reaches the image recording device 4.

Figure 2:
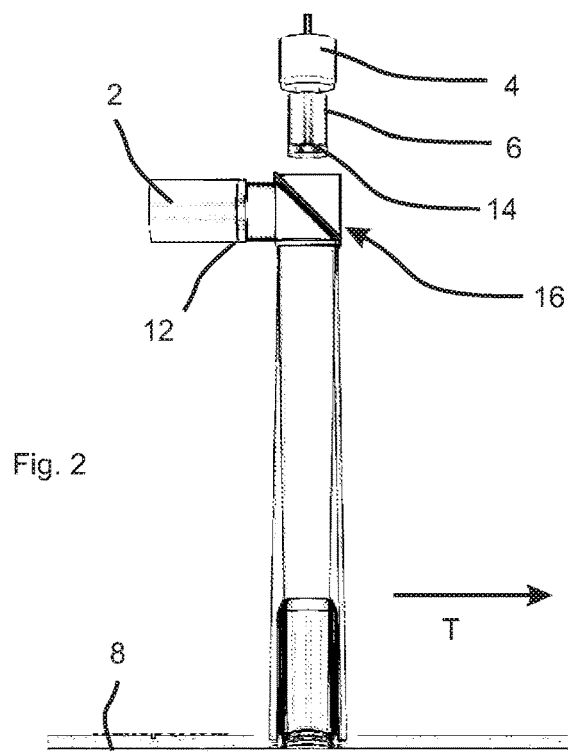
FIG. 2 shows a second embodiment of the apparatus according to embodiments of the invention.

FIG. 2 shows a further embodiment of the present invention. In this embodiment, a coaxial structure of the image recording device and illumination device is used. The reference sign 16 refers to a beam splitter by means of which the radiated and reflected radiation can be made to run parallel to each other. A disadvantage of this method is that a large proportion of the irradiated light is lost, which is disadvantageous for a low-light dark field method.

In addition, a disadvantage can arise from the fact that such beam splitters 16 are often optically active themselves and change the polarization direction and intensity of light. This means that a conventional beam splitter 16 essentially relies on a circular polarizing filter method, where a polarizing filter should ideally be located below the beam splitter 16.

For improved inspection with linearly polarized light, a polarizing beam splitter (for example a beam splitter cube) is desired. This allows polarized light to pass through in the correct polarization direction, while polarized light is reflected perpendicular to it. In this way, there are practically no losses in light conduction. For a dark-field method as described here, however, linear polarizing filters are still recommended in front of the image recording device and the radiation device, since in this case the extinction ratio to the polarizing beam splitter is somewhat worse.

In particular, the inspection technique described here can also be used to find foreign objects such as foils, which are located in particular at the bottom of the container. Weak or non-polarizing foils are also seen.

The method described here can be carried out with conventional image recording devices or cameras. It is not absolutely necessary to use newer and also relatively expensive polarization cameras, as there is no significant advantage, especially for the dark field method. However, it would also be possible to use polarization cameras, as described above.

In the embodiment shown in FIG. 3, the image recording device 4 is arranged centrally above the container 10 (at the time of image recording). Furthermore, two illumination devices 2 (each designed as spotlight illumination) are arranged laterally (to the right and to the left) next to the image recording device 4. It would also be possible for several such illumination devices to be provided. In this embodiment, polarization devices are again provided which polarize the light emitted by the illumination devices, and also a polarization device which polarizes the light reflected from the inner base wall.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An apparatus for inspecting a non-transparent and reflective can, having a transport device which transports the can along a predetermined transport path, having an illumination device which illuminates the can to be inspected and radiates radiation through an opening in the can onto an inner base wall of the can and having an image recording device, which records at least one spatially resolved image of the radiation irradiated by the illumination device onto the inner base wall and reflected by the inner base wall and/or which records a spatially resolved image of the inner base wall illuminated by the illumination device, wherein the apparatus has a first polarization device in a beam path between a light source of the illumination device and the inner base wall in such a way that the radiation reaching the inner base wall is polarized, wherein the illumination device being configured in such a way that a proportion of the radiation irradiated into the can by the illumination device reaches the inner base wall, and wherein the radiation irradiated into the can by the illumination device is reflected only at the inner base wall before it reaches the image recording device.

2. The apparatus according to claim 1, wherein the radiation irradiated by illumination devices onto the inner base wall encloses an angle with a direction perpendicular with respect to the inner base wall which is less than 30.

3. The apparatus according to claim 2, wherein the illumination device and/or the image recording device have a distance from a mouth of the can which is greater than 100 mm.

4. The apparatus according to claim 1, wherein the image recording device captures the image at an angle with respect to a direction perpendicular with respect to the inner base wall which is less than 30°.

5. The apparatus according to claim 1, wherein a polarization device is arranged between the inner base wall and the image recording device.

6. The apparatus according to claim 1, wherein the illumination device is a point light source or a spotlight source.

7. The apparatus according to claim 1, wherein the apparatus has a second illumination device which illuminates the inner base wall, wherein the radiations irradiated by the two illumination devices onto the inner base wall having different polarization properties.

8. The apparatus according to claim 1, wherein the image recording device comprises a polarization camera.

9. A method for inspecting a non-transparent and reflective can, wherein a transport device transports the can along a predetermined transport path and an illumination device illuminates the can to be inspected and radiates radiation through an opening of the can onto an inner base wall of the can and an image recording device records at least one spatially resolved image of the inner base wall, wherein a first polarization device provided in a beam path between a light source of the illumination device and the inner base wall polarizes the radiation reaching the inner base wall, wherein a proportion of the radiation irradiated into the can by the illumination device reaches the inner base wall, and wherein the radiation irradiated into the can by the illumination device is reflected only at the inner base wall before it reaches the image recording device.

10. The method according to claim 9, wherein on the basis of the image recorded by the image recording device, the presence of foil elements within the can is concluded.

11. The method according to claim 9, wherein radiation reflected from the inner wall passes through a polarization device before reaching the image recording device.

* * * * *